United States Patent [19]

Kuijk et al.

[11] 4,141,051
[45] Feb. 20, 1979

[54] VARIABLE DYNAMIC RANGE MAGNETO-RESISTIVE HEAD

[75] Inventors: Karel E. Kuijk; Frederik W. Gorter; Jan A. L. Potgiesser, all of Eindhoven, Netherlands

[73] Assignee: U.S. Philips Corporation, New York, N.Y.

[21] Appl. No.: 840,761

[22] Filed: Oct. 11, 1977

[51] Int. Cl.² ............................................. G11B 5/30
[52] U.S. Cl. .................................. 360/113; 338/32 R
[58] Field of Search ........................ 360/113; 324/46; 338/32 R

[56] References Cited

U.S. PATENT DOCUMENTS

| 3,848,217 | 11/1974 | Lazzari | 360/113 |
| 4,040,113 | 8/1977 | Gorter | 360/113 |
| 4,052,748 | 10/1977 | Kuijk | 360/113 |

FOREIGN PATENT DOCUMENTS 2308158  4/1976  France .................................... 360/113

OTHER PUBLICATIONS

IBM Technical Disclosure Bulletin, vol. 20, No. 2, Jul. 1977, pp. 791–793. "Barberpole MR Head".

Primary Examiner—John H. Wolff
Attorney, Agent, or Firm—David R. Treacy; Robert S. Smith

[57] ABSTRACT

A magnetic reading head having a magneto-resistive element of the non-magnetically biased type, in which the current is forced to flow through the element at an angle with the easy axis of magnetization. For adjusting the dynamic range of the element, the element is subjected to a variable strength auxiliary field having a direction of which is parallel to the easy axis of magnetization.

2 Claims, 4 Drawing Figures

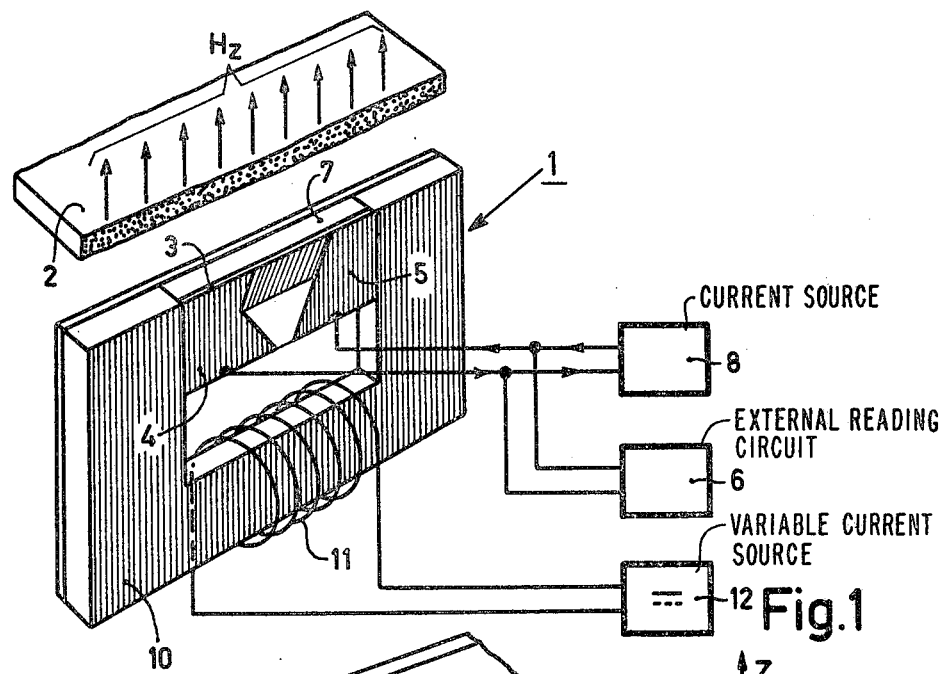
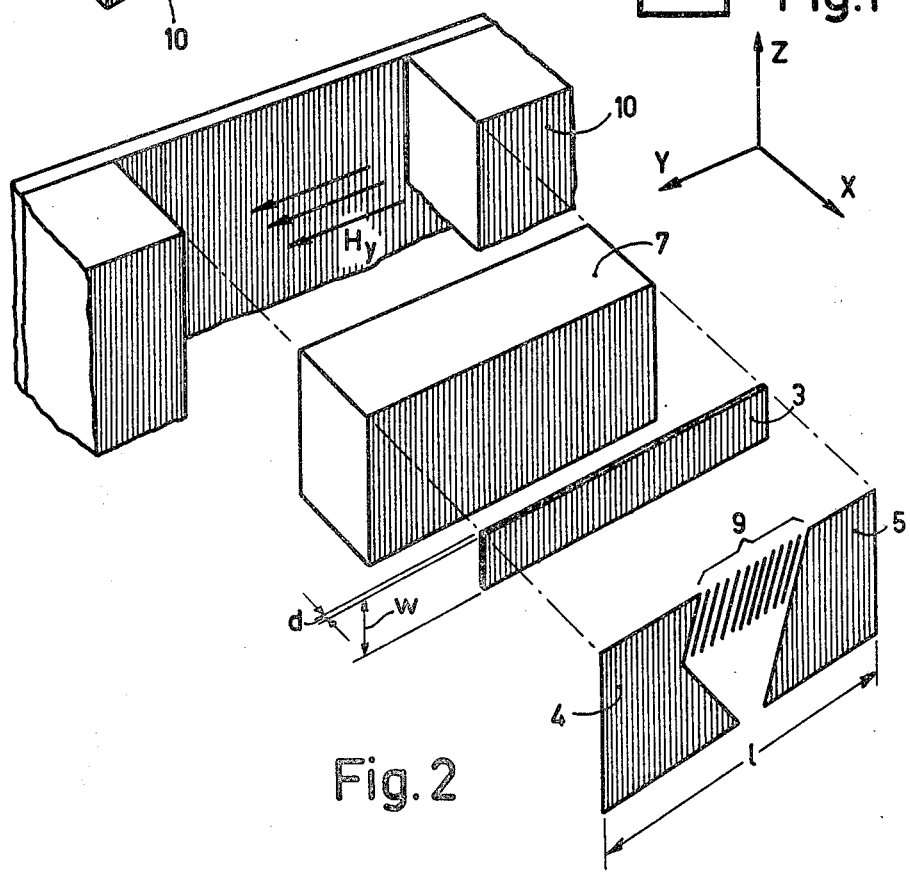
Fig.1
Fig.2

VARIABLE DYNAMIC RANGE MAGNETO-RESISTIVE HEAD

The invention relates to a magnetic reading head for detecting information-representing magnetic fields on a magnetic recording medium, comprising a magneto-resistive element of metallic ferromagnetic material which is supported on a substrate, which has an easy axis of magnetization in the plane of the element and which is provided with electrical contacts for enabling it to be connected to a source of measuring current, means which force the measuring current to flow through the element at an angle of at least 35° and at most 55° with the easy axis of magnetization, and a magnetic device for subjecting the element to a magnetic auxiliary field which is parallel to the easy axis of magnetization.

A head of the above-mentioned kind is described in "The Barberpole, a linear magneto-resistive head" in IEEE Transactions on Magnetics, Sept. 1975, Vol. MAG 11, No. 5, pp 1215–1217.

This paper describes a head using a strip-shaped element of a ferro-magnetic metallic material having low anisotropy, for example Ni-Fe, which is held with one of its edges in the immediate proximity of, or in contact with, a magnetic recording medium. The fields on the recording medium produce variations in the magnetization of the element when the medium is moved across the head and modulate the resistance thereof via the magneto-resistance effect. Thus, when the recording medium passes the head, the information-representing magnetic fields present on the medium rotate the spin system of the magneto-resistive element to cause a variation in the electrical resistance of the element. When a detection circuit is connected to the element then an output signal from this circuit can be a function of the information stored in the recording medium.

Since the variation in the resistance of a magneto-resistive element under the influence of an external magnetic field is quadratic, it is usual in reproducing analogically recorded signals to optimize the operation of the head by linearization of the resistance-magnetic field characteristic. For this purpose, the magnetization direction of the element in the presence of a signal field of zero strength should be caused to make an angle of approximately 45° with the direction of current flow through the element.

With the magneto-resistive reading head described in the paper this is achieved by making the easy axis of magnetization lie parallel to the largest dimension of the element and providing bias means which force the current to flow through the element at an angle of approximately 45° with the longitudinal direction.

The head of the paper furthermore comprises a magnetic device for producing a magnetic auxiliary field in a direction parallel to the easy axis of magnetization of the element. The use of the auxiliary field ensures that one of the two opposite directions along which the magnetization vector may orient itself is favored more than the other direction so that reversal from one direction to the other, which would result in a variation of the resistance of the element, is prevented.

In magneto-resistive heads of the above-described kind, the output signal V may be written as $V = f(\alpha, h, H_o)$, wherein $\alpha$ is the angle between the magnetization and the current direction with a signal field of zero strength, h is the signal field strength of the recording medium, and $H_o$ is a characteristic quantity for a given magneto-resistive element which may be written as $$H_o = (\frac{d}{w} \times 4\pi M_s) + H_k,$$

wherein d is the thickness of the magneto-resistive element, w is the height, $M_s$ is the saturation magnetization, and $H_k$ is the anisotropy field.

With a given average value of h it is usual to adjust the angle $\alpha$ to provide a minimum distorsion of the output signal. (As already noted, $\alpha$ usually has a value in the proximity of 45°). Once $\alpha$ has been adjusted, for example, by arranging a pattern of equipotential strips or of slots which force the current to flow at a given angle any change of the angle is no longer possible. The dynamic range of h, that is the maximum amplitude of h for a permissible degree of distorsion, then follows from the characteristic quantity $H_O$ which is determined by the geometry and the physical properties of the selected element. A disadvantage of this arrangement is that the dynamic range is fixed in construction of the head and it cannot be changed subsequently for example, to adapt the head to the use of different recording materials or according to the magnitude of the average signal which is required to be read out.

It is the object of the invention to provide a magnetic reading head of the kind mentioned in the preamble in which the dynamic range can be adjusted according to the signal required to be read out. For that purpose, the reading head according to the invention is characterized in that, for adjusting the dynamic range of the element, means are present to vary the strength of the auxiliary field between $0.1 \, H_o$ and $5 \, H_o$ wherein $$H_o = (\frac{d}{w} \times 4 M_s) + H_k,$$

wherein d is the thickness of the magnetoresistive element, w is the height, $M_s$ is the saturation magnetization, and $H_k$ is the anisotropy field.

The invention is based on the fact that by varying the strength of the auxiliary field the slope of the resistance-signal field characteristic of linearized magneto-resistive elements of the present kind, that is to say linearized by non-magnetic means, varies with the operating point remaining the same. This in contrast with the behaviour of magneto-resistive elements the characteristic of which is linearized by applying a magnetic field at right angles to the easy axis of magnetization. In magneto-resistive elements of such a magnetically biased type, the operating point shifts when the strength of the bias field is varied, so distortion occurs.

Although it is possible in non-magnetically biased magneto-resistive heads of the kind mentioned in the preamble to enforce the desired current direction in various manners, for example, by providing slots in the element which extend at the desired angle with respect to the longitudinal direction and alternately open into the upper and lower side, a different construction is used in a preferred embodiment of the invention. According to a different aspect of the invention there is provided a head in which the easy axis of magnetization is parallel to the largest dimension of the element and in that a number of parallel equipotential strips of electrically conductive material are provided on a major surface of the magneto-resistive element at an angle of at least 35° and at most 55° with the largest dimension between the contacts. An advantage of this construction is that in applications in which the magneto-resistive element is in contact with the recording medium, the improved operation need not be lost in the event of some surface wear of the element which would be likely in a construction having slots. In addition, the magnetic continuity of a magneto-resistive element is not interrupted when equipotential strips are provided on it. In a construction having slots on the contrary the magnetic continuity may possibly become damaged when surface wear occurs.

The invention will now be described in greater detail, by way of example, with reference to the accompanying drawings, but is not restricted to this embodiment.

In the drawings:

FIG. 1 is a simplified perspective view of a magnetic reading head according to the invention with the associated circuits in block form.

FIG. 2 shows the individual components of FIG. 1 on an enlarged scale.

Figure 3:
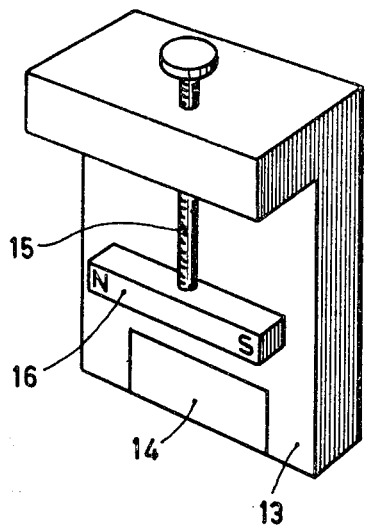
FIG. 3 is a perspective view showing a substrate on which a non-magnetically biased magneto-resistive element is provided and a magnet which can be moved by means of a screw.

FIG. 1 shows a magneto-resistive head 1 which is depicted in use for reading the information content of a magnetic recording medium 2. The head 1 comprises a magneto-resistive element 3 which is connected to an external reading circuit 6 via electrically conductive contacts 4 and 5. The element 3, and the contacts 4 and 5 are formed on a substrate 7, which may be glass, by means of thin-film techniques. For supplying a measuring current, a current source 8 is connected to the contact 4 and 5. FIG. 2, in which the same reference numerals as those in FIG. 1 are used for the same components, shows the individual components of the head on a larger scale. In this embodiment the element 3 is a thin layer of an Ni-Fe alloy having a thickness d of approximately 0.1 micron, a length l of 100 microns and a height w of 10 microns. The contacts 4 and 5 are formed by vapour-deposited gold strips. A number of thin gold strips 9, thickness 1 micron, width 2 microns, are provided on the element 3 at a mutual distance of 2.5 microns and at an angle of 45°. The gold has a 5 times lower resistivity than the Ni-Fe alloy used, and the thickness of the gold strips is approximately 10 times as large as the thickness d of the magneto-resistive element material. Therefore the gold strips conduct 50 times better and serve as "equipotential strips" which force the current in the Ni-Fe path between them to flow at an angle of approximately 45° with the longitudinal direction. When the head is brought in flux coupling with an information-containing magnetic field, the resistance of each of the Ni-Fe paths situated between the equipotential strips 9 will decrease or increase in accordance with the fact whether the direction of magnetization under the influence of the field coincides more or less with the direction of current. In this manner, magnetic recordings can be reproduced with low distortion by means of a non-magnetically biased magneto-resistive head.

Figure 4:
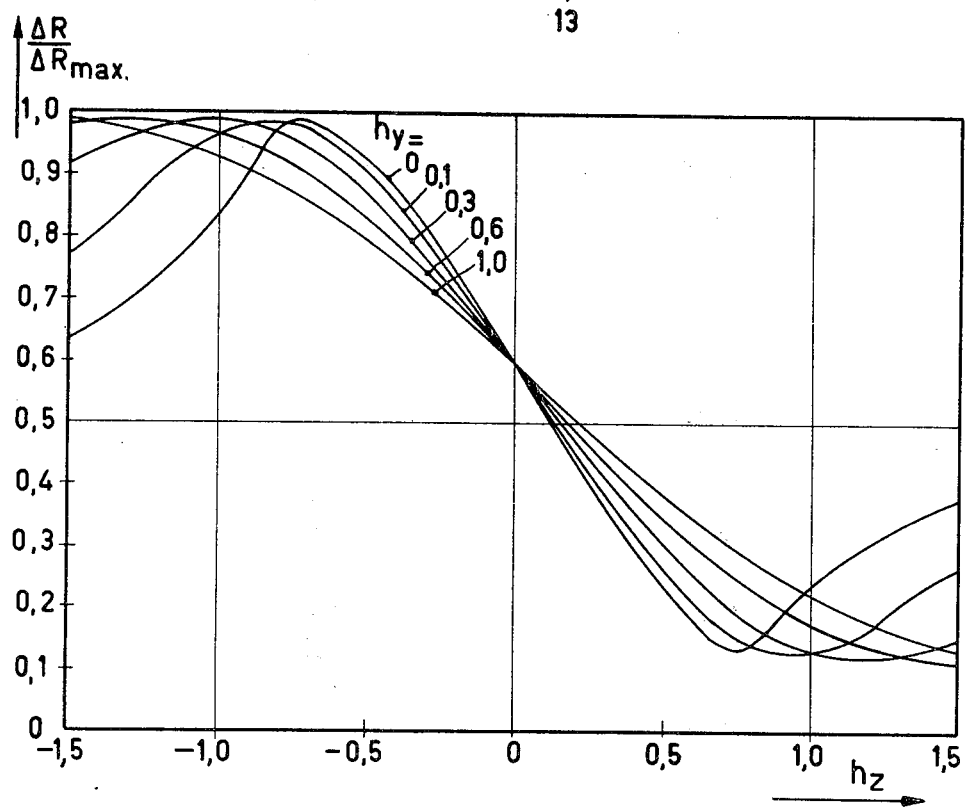
FIG. 4 is a graph showing the resistance variation $\Delta R/\Delta R_{MAX}$ of the magneto-resistive element 3 of the head shown in FIG. 1 as a function of a transversal external field $h_z$ at various values of a longitudinal field $h_y$.

A longitudinal auxiliary field $H_y$ is generated by means of a magnet core 10. The strength of said auxiliary field can be varied between 0.1 $H_o$ and 5 $H_o$ by varying a current through a coil 11 which is connected to a variable current source 12, $H_o$ being a characteristic quantity, as defined above, for the dimensions and material of the element in question. Said field strength may be such that it is unlikely to damage the stored information on the medium 2. It is alternatively possible to use a permanent magnet which is magnetized parallel to the longitudinal direction of the magneto-resistive element and which is supported at a variable distance from the element. The use of a permanent magnet is illustrated diagrammatically in FIG. 3 which shows a substrate 13 on which a non-magnetically biased magneto-resistive element 14 is provided and a magnet 16 which can be moved by means of a screw 15. In order to illustrate the effects of the variation of the auxiliary field, FIG. 4 shows the variation $\Delta R/\Delta R_{max}$ of the resistance of the element 3 under the influence of a signal field $H_z$ with various strengths of an auxiliary field $h_y$ in the $+y$ direction. It is to be noted that both the signal field $h_z$ and the auxiliary field $h_y$ are standardized, that is $h_z = H_z/H_o$ and $h_y = H_y/H_o$, where $H_z$ and $H_y$ are the actual signal field strength and the actual longitudinal field strength, respectively. The characteristic quantity $H_o$ which depends inter alia on the ratio height/thickness w/d in practice proves to be usually between ten and a hundred Oersteds.

What is claimed is:

1. A magnetic reading head for detecting information representing magnetic fields on an associated magnetic recording medium which comprises: a substrate; a generally planar magneto-resistive element of metallic, ferro-magnetic material supported on said substrate, said magneto-resistive element having an easy axis of magnetization in a major plane of said element, said element including electrical contacts for enabling said element to be connected to an associated source of measuring current; means for forcing the measuring current from said source of measuring current to flow through said element at an angle of at least 35° and at most 55° with the easy axis of magnetization; a magnetic device to subject the element to a magnetic auxiliary field which is parallel to the easy axis of magnetization; and means for adjusting the dynamic range of the element comprising means to vary the strength of the auxiliary field between 0.1 $H_o$ and 5$H_o$, wherein $$H_o = (\frac{d}{w} \times 4 M_s) + H_k,$$

d is the thickness of said magneto-resistive element, w is the height of said magneto-resistive element, $M_s$ is the saturation magnetization, and $H_k$ is the anisotropy field.

2. A magnetic reading head as claimed in claim 1 wherein the easy axis of magnetization of said magneto-resistive element is parallel to the largest dimension of said element and a number of parallel equipotential strips of electrically conductive material are provided on a major surface of said magneto-resistive element at an angle of at least 35° and at most 55° with the largest dimension between said contacts.

* * * * *